(12) United States Patent
Kuramashi et al.

(10) Patent No.: US 10,302,003 B2
(45) Date of Patent: May 28, 2019

(54) EXHAUST INSULATOR STRUCTURE FOR MULTI-CYLINDER ENGINE

(71) Applicant: MAZDA MOTOR CORPORATION, Hiroshima (JP)

(72) Inventors: Taku Kuramashi, Hatsukaichi (JP); Akira Hatsuzaki, Hatsukaichi (JP); Tomonori Nishida, Higashihiroshima (JP); Takashi Sasada, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 273 days.

(21) Appl. No.: 15/428,171

(22) Filed: Feb. 9, 2017

(65) Prior Publication Data

US 2017/0260893 A1  Sep. 14, 2017

(30) Foreign Application Priority Data

Mar. 14, 2016 (JP) ................................. 2016-049425

(51) Int. Cl.
| | |
|---|---|
| *F01N 13/10* | (2010.01) |
| *F01N 3/10* | (2006.01) |
| *F02B 75/20* | (2006.01) |
| *F02D 17/02* | (2006.01) |
| *F02B 75/18* | (2006.01) |

(52) U.S. Cl.
CPC ............ *F01N 13/102* (2013.01); *F01N 3/10* (2013.01); *F02B 75/20* (2013.01); *F02D 17/02* (2013.01); *F01N 2260/022* (2013.01); *F02B 2075/1816* (2013.01); *Y02A 50/2322* (2018.01)

(58) Field of Classification Search
CPC .... F01N 13/102; F01N 3/10; F01N 2260/022; F02B 75/20; F02B 75/1816; F02D 17/02
See application file for complete search history.

(56) References Cited

U.S. PATENT DOCUMENTS 1,517,634 A * 12/1924 Junkers ................... F01N 13/10
 237/12.3 A
1,684,599 A * 9/1928 Ryder ...................... B60H 1/18
 165/41

FOREIGN PATENT DOCUMENTS

| JP | 511825 | * | 1/1976 |
| JP | H08-093740 A | | 4/1996 |
| JP | 2005201093 A | * | 7/2005 |

(Continued)

*Primary Examiner* — Patrick D Maines
(74) *Attorney, Agent, or Firm* — Studebaker & Brackett PC

(57) ABSTRACT

Disclosed herein is an exhaust insulator structure for a multi-cylinder engine of a vehicle. The structure includes an exhaust manifold, an exhaust gas purifier, and a heat insulator. The engine is able to switch its mode of operation from an all-cylinder operation in which all of four cylinders thereof are activated to a cylinder-cutoff operation in which two of the four cylinders are deactivated to serve as idle cylinders and the other two cylinders are activated to serve as active cylinders, or vice versa. The exhaust manifold includes: idle-cylinder-connected branched exhaust piping communicating with the idle cylinders; and active-cylinder-connected branched exhaust piping communicating with the active cylinders. A portion of the heat insulator facing the active-cylinder-connected branched exhaust piping has an opening that lets air blowing against the vehicle traveling into the heat insulator.

9 Claims, 9 Drawing Sheets

(56) References Cited

FOREIGN PATENT DOCUMENTS

JP          893470       *  4/2006
JP     2010132171 A  *  6/2010

* cited by examiner

EXHAUST INSULATOR STRUCTURE FOR MULTI-CYLINDER ENGINE

CROSS-REFERENCE TO RELATED APPLICATION

This application claims priority to Japanese Patent Application No. 2016-049425 filed on Mar. 14, 2016, the entire disclosure of which is hereby incorporated by reference.

BACKGROUND

The present disclosure relates to an exhaust insulator structure for a multi-cylinder engine.

A known exhaust insulator structure includes a heat insulator covering an exhaust manifold entirely to check a decrease in the temperature of an exhaust gas, and having an opening for letting air blowing against the vehicle traveling into itself. For example, Japanese Unexamined Patent Publication No. H08-093470 discloses an exhaust insulator structure including a front-side heat insulator and a backside heat insulator. The front-side heat insulator covers a front side of an exhaust manifold entirely and also covers two side surfaces of the exhaust manifold partially with a gap left with respect to the exhaust manifold. The backside heat insulator covers a backside of the exhaust manifold and also covers the rest of the two side surfaces of the exhaust manifold with a gap left with respect to the exhaust manifold as well. The front-side heat insulator has a first airflow inlet (opening), and the backside heat insulator has an airflow outlet. In addition, a second airflow inlet (opening) is cut through a portion of the backside heat insulator that covers the two side surfaces of the exhaust manifold so as to guide the incoming airflow toward an upstream point.

SUMMARY

A multi-cylinder engine with multiple cylinders may repeatedly perform an all-cylinder cylinder operation in which all of its cylinders are activated and a cylinder-cutoff operation in which some of its cylinders are deactivated but the others are activated, in order to improve the fuel efficiency while the vehicle is traveling at high speeds.

In general, such a multi-cylinder engine specifies in advance what cylinders should serve as idle cylinders to be deactivated during the cylinder-cutoff operation and what cylinders should serve as active cylinders to be activated during the cylinder-cutoff operation, and keeps the active cylinders always activated as long as the engine is up and running. That is why such a multi-cylinder engine puts a heavier thermal load on the active cylinders than on the idle cylinders, and therefore, tends to bring pipes communicating with those active cylinders to an elevated temperature in the exhaust manifold. Particularly when a heat insulator is provided to cover the exhaust manifold entirely, the inside of the heat insulator comes to have so high a temperature that the pipes communicating with the active cylinders reach too high a temperature. This is because the heat insulator decreases the quantity of heat dissipated from the pipes. Such an excessively high temperature of the pipes communicating with the active cylinders prevents the temperature of the exhaust gas released from the active cylinders from being sufficiently lowered in the exhaust manifold. As a result, an exhaust gas at a temperature exceeding the maximum allowable temperature of the exhaust gas purifier could enter the exhaust gas purifier, thus possibly undermining the exhaust gas purification ability of the exhaust gas purifier.

To prevent such a high-temperature exhaust gas from causing a failure of the exhaust gas purifier, someone proposed that an unburned fuel be added to the exhaust gas and vaporized with the heat of the exhaust gas purifier in order to cool the exhaust gas purifier with the heat of that vaporization. According to this method, however, the fuel efficiency decreases by the amount of the unburned fuel added to the exhaust gas.

Thus, to overcome such a problem, as in the exhaust insulator structure disclosed in Japanese Unexamined Patent Publication No. H08-093470, an opening may be cut through the heat insulator so that the air flows through the opening and cools the pipes communicating with the active cylinders.

In the exhaust insulator structure disclosed in Japanese Unexamined Patent Publication No. H08-093470, however, the openings are cut through the heat insulator not only on the front-side of the exhaust manifold but also both side surfaces of the exhaust manifold to let the air blowing against the vehicle traveling into the exhaust manifold easily. In such a structure, that air blowing against the vehicle traveling also easily enters and cools the pipes communicating with the idle cylinders. Cooling those pipes communicating with the idle cylinders keeps the heat of the exhaust gas from being conducted efficiently to the exhaust gas purifier through those pipes communicating with the idle cylinders right after the mode of operation has been switched from the cylinder-cutoff operation to the all-cylinder operation. This hampers the catalyst in the exhaust gas purifier from raising its temperature easily, thus possibly resulting in a decline in the exhaust gas purification ability of the exhaust gas purifier.

It is therefore an object of the present disclosure to check a decrease in the temperature of the overall exhaust manifold and to prevent a particular portion of the exhaust manifold from generating excessive heat locally while the vehicle is traveling at high speeds.

To achieve this object, the present disclosure provides an exhaust insulator structure for a multi-cylinder engine of a vehicle. The structure includes: an exhaust manifold configured to collect together multiple flows of an exhaust gas released from a plurality of columnar cylinders of the multi-cylinder engine; an exhaust gas purifier connected to an exhaust gas downstream end of the exhaust manifold and configured to purify the exhaust gas; and a heat insulator configured to cover the exhaust manifold and the exhaust gas purifier with some gap left with respect to the exhaust manifold and the exhaust gas purifier. The engine is able to switch its mode of operation from an all-cylinder operation in which all of the plurality of cylinders are activated to a cylinder-cutoff operation in which some of the plurality of cylinders are deactivated to serve as idle cylinders and the other cylinders are activated to serve as active cylinders, or vice versa. The exhaust manifold includes: idle-cylinder-connected branched exhaust piping communicating with the idle cylinders; and active-cylinder-connected branched exhaust piping communicating with the active cylinders. A portion of the heat insulator facing the active-cylinder-connected branched exhaust piping has an opening that lets air blowing against the vehicle traveling into the heat insulator.

According to this configuration, a portion of the heat insulator facing the active-cylinder-connected branched exhaust piping has an opening that lets air blowing against the vehicle traveling into the heat insulator. This facilitates selectively cooling the active-cylinder-connected branched exhaust piping without causing the temperature of the idlecylinder-connected branched exhaust piping to fall, thus checking a decrease in the temperature of the overall exhaust manifold and preventing a particular portion of the exhaust manifold from generating excessive heat locally while the vehicle is traveling at high speeds.

Specifically, covering the exhaust manifold and the exhaust gas purifier with the heat insulator makes it easier to keep the temperature of the exhaust manifold higher compared to a situation where no heat insulators are provided. In addition, a portion of the heat insulator facing the active-cylinder-connected branched exhaust piping has such an opening. Thus, while the vehicle is traveling at high speeds, the air blowing against the vehicle enters the heat insulator through the opening to lash directly against the active-cylinder-connected branched exhaust piping. That is to say, the air blowing against the vehicle traveling may cool the active-cylinder-connected branched exhaust piping, thus preventing the active-cylinder-connected branched exhaust piping from generating too much heat. This checks a decrease in the temperature of the overall exhaust manifold and prevents a portion of the exhaust manifold from generating excessive heat while the vehicle is traveling at high speeds.

In addition, cooling the active-cylinder-connected branched exhaust piping appropriately in this manner with the air blowing against the vehicle traveling at high speeds saves the use of an unburned fuel to cool the exhaust gas purifier, thus contributing to improving the fuel efficiency as well.

In one embodiment of the exhaust insulator structure for a multi-cylinder engine, the multi-cylinder engine is mounted transversely in an engine compartment at a frontend of the vehicle such that a direction in which the columnar cylinders are arranged in line is parallel to a vehicle width direction. A side surface of the engine facing a rear end of the vehicle is coupled to the exhaust manifold. An exhaust gas upstream end of each of the idle-cylinder-connected branched exhaust piping and the active-cylinder-connected branched exhaust piping is arranged to extend from the side surface of the engine facing the rear end of the vehicle toward the rear end of the vehicle. The heat insulator includes: an upper cover configured to cover, and arranged over, the exhaust manifold and the exhaust gas purifier; and a lower cover configured to cover, and arranged under, the exhaust manifold and the exhaust gas purifier. The opening is cut through a portion of an upper surface of the upper cover facing the active-cylinder-connected branched exhaust piping.

Specifically, in this embodiment, the multi-cylinder engine is mounted in the engine compartment at the frontend of the vehicle and the opening is cut through a portion of an upper surface of the upper cover facing the active-cylinder-connected branched exhaust piping. Thus, the opening faces the vehicle's hood. In general, the hood usually has an acoustic insulation to muffle the engine sound. Therefore, even the engine sound leaking through the opening will be absorbed into the acoustic insulation. That is to say, cutting the opening through the upper cover improves the acoustic insulation ability sufficiently to prevent the engine sound from being easily transmitted to inside and outside the vehicle cabin.

In another embodiment of the exhaust insulator structure for a multi-cylinder engine, the engine is an in-line four-cylinder engine. The direction in which the four cylinders of the engine are arranged in line is parallel to the engine. If the four cylinders are sequentially called first, second, third, and fourth cylinders, respectively, from one of the four cylinders located at one end of the engine toward another one of the four cylinders located at the other end of the engine, then the first and fourth cylinders serve as the idle cylinders and the second and third cylinders serve as the active cylinders. The idle-cylinder-connected branched exhaust piping is comprised of: two idle-cylinder-connected independent exhaust pipes respectively communicating with the two idle cylinders; and an idle-cylinder-connected intermediate collecting pipe formed by combining together the two idle-cylinder-connected independent exhaust pipes. The active-cylinder-connected branched exhaust piping is comprised of: two active-cylinder-connected independent exhaust pipes respectively communicating with the two active cylinders; and an active-cylinder-connected intermediate collecting pipe formed by combining together the two active-cylinder-connected independent exhaust pipes. The exhaust manifold further includes a last collecting pipe formed by combining together those idle-cylinder-connected and active-cylinder-connected intermediate collecting pipes. The exhaust gas purifier is connected to an exhaust gas downstream end of the last collecting pipe. The active-cylinder-connected independent exhaust pipes are arranged to pass through a space over the idle-cylinder-connected independent exhaust pipes.

According to this configuration, the active-cylinder-connected independent exhaust pipes are arranged to pass through a space over the idle-cylinder-connected independent exhaust pipes. Thus, the exhaust gas upstream ends of the active-cylinder-connected independent exhaust pipes and the active-cylinder-connected intermediate collecting pipe are located over the idle-cylinder-connected independent exhaust pipes. This allows the air blowing into the heat insulator through the opening while the vehicle is traveling to lash against the active-cylinder-connected branched exhaust piping more easily, thus cooling the active-cylinder-connected branched exhaust piping more efficiently.

In addition, in this embodiment, the second and third cylinders of the in-line four-cylinder engine are active cylinders, and therefore, the active-cylinder-connected independent exhaust pipe communicating with the second cylinder and the active-cylinder-connected independent exhaust pipe communicating with the third cylinder are adjacent to each other. This narrows down the range with the opening compared to a situation where the two active-cylinder-connected independent exhaust pipes are arranged distant from each other. Consequently, the air blowing into the heat insulator while the vehicle is traveling may be minimized and the decrease in the temperature of the idle-cylinder-connected independent exhaust pipes and the exhaust gas purifier due to the air blowing against the vehicle traveling may be checked more reliably.

In this particular embodiment, the active-cylinder-connected intermediate collecting pipe is arranged to pass through a space over the idle-cylinder-connected intermediate collecting pipe. The opening is located to face the two active-cylinder-connected independent exhaust pipes and a portion where the two active-cylinder-connected independent exhaust pipes are combined together when the heat insulator covers the exhaust manifold and the exhaust gas purifier.

According to this configuration, the entire active-cylinder-connected branched exhaust piping is located over the idle-cylinder-connected branched exhaust piping. This more reliably prevents the air blowing into the heat insulator through the opening while the vehicle is traveling from causing a decrease in the temperature of the idle-cylinder-connected independent exhaust pipes. In addition, the two active-cylinder-connected independent exhaust pipes and the portion where the two active-cylinder-connected independent exhaust pipes are combined together, where the temperature tends to rise particularly easily in the active-cylinder-connected branched exhaust piping, may be cooled intentionally with the air blowing against the vehicle traveling. Consequently, the active-cylinder-connected branched exhaust piping may be cooled even more efficiently.

In the embodiment described above, the upper cover and the lower cover are arranged such that when the heat insulator covers the exhaust manifold and the exhaust gas purifier, a lower end of the upper cover is located outside of an upper end of the lower cover and that a gap is left between the lower end of the upper cover and the upper end of the lower cover.

This configuration allows the air blowing into the heat insulator through the opening while the vehicle is traveling to go out of the heat insulator through the gap between the lower end of the upper cover and the upper end of the lower cover. Thus, the air blowing against the vehicle traveling is allowed to go smoothly out of the heat insulator.

In the embodiment described above, a downstream exhaust pipe allowing the exhaust gas purified by the exhaust gas purifier to pass therethrough is connected to an exhaust gas downstream end of the exhaust gas purifier. The heat insulator covers the exhaust manifold and the exhaust gas purifier as well as a region surrounding a portion where the downstream exhaust pipe is connected to the exhaust gas purifier. A portion of the heat insulator located closer to the rear end of the vehicle than the idle-cylinder-connected branched exhaust piping has a tunnel portion allowing a portion of the downstream exhaust pipe, located closer to a downstream end of the exhaust gas than the portion connected to the exhaust gas purifier, to reach outside of the heat insulator.

According to this configuration, the tunnel portion provided for the heat insulator allows the air blowing into the heat insulator through the opening while the vehicle is traveling to go out of the heat insulator therethrough. Thus, the air blowing against the vehicle traveling may go out of the heat insulator even more smoothly.

In such an exhaust insulator structure in which the heat insulator has the tunnel portion, the tunnel portion is suitably cut through the lower cover.

This configuration simplifies the structure of the upper cover.

In the embodiment described above, the active-cylinder-connected independent exhaust pipes are suitably shorter in length than the idle-cylinder-connected independent exhaust pipes.

If the cylinder-cutoff operation is performed while the vehicle is traveling at high speeds while emitting an exhaust gas, of which the temperature does not exceed the permissible temperature of the exhaust gas purifier, setting the length of the active-cylinder-connected independent exhaust pipes to be shorter than that of the idle-cylinder-connected independent exhaust pipes allows the heat of the exhaust gas released from the active cylinders to be conducted efficiently to the catalyst in the exhaust gas purifier. This checks the decrease in the temperature of the catalyst effectively.

In the embodiment described above, the exhaust gas purifier is suitably located under the idle-cylinder-connected independent exhaust pipes.

Specifically, while the engine is performing the cylinder-cutoff operation, the active-cylinder-connected independent exhaust pipes have a higher temperature than the idle-cylinder-connected independent exhaust pipes, because a high-temperature exhaust gas is introduced into the active-cylinder-connected independent exhaust pipes during the cylinder-cutoff operation. In addition, even during the cylinder-cutoff operation, the exhaust gas that has flowed through active-cylinder-connected branched exhaust piping is also supplied to the exhaust gas purifier, which is heated by the heat of reaction between the exhaust gas and the catalyst. Thus, the exhaust gas purifier also has a higher temperature than the idle-cylinder-connected independent exhaust pipes during the cylinder-cutoff operation. Therefore, if the exhaust gas purifier is located under the idle-cylinder-connected independent exhaust pipes, then the idle-cylinder-connected independent exhaust pipes are located between the exhaust gas purifier and the active-cylinder-connected independent exhaust pipes. As a result, the idle-cylinder-connected independent exhaust pipes are vertically heated both upward and downward by the exhaust gas purifier and the active-cylinder-connected independent exhaust pipes. This checks the decrease in the temperature of the idle-cylinder-connected independent exhaust pipes even more effectively during the cylinder-cutoff operation. In addition, even right after the mode of operation has been switched from the cylinder-cutoff operation to the all-cylinder operation, the heat of the exhaust gas released from the idle cylinders may also be conducted efficiently to the exhaust gas purifier.

DETAILED DESCRIPTION

Embodiments of an exhaust insulator structure for a multi-cylinder engine according to the present disclosure will be described in detail with reference to the accompanying drawings.

Figure 1:
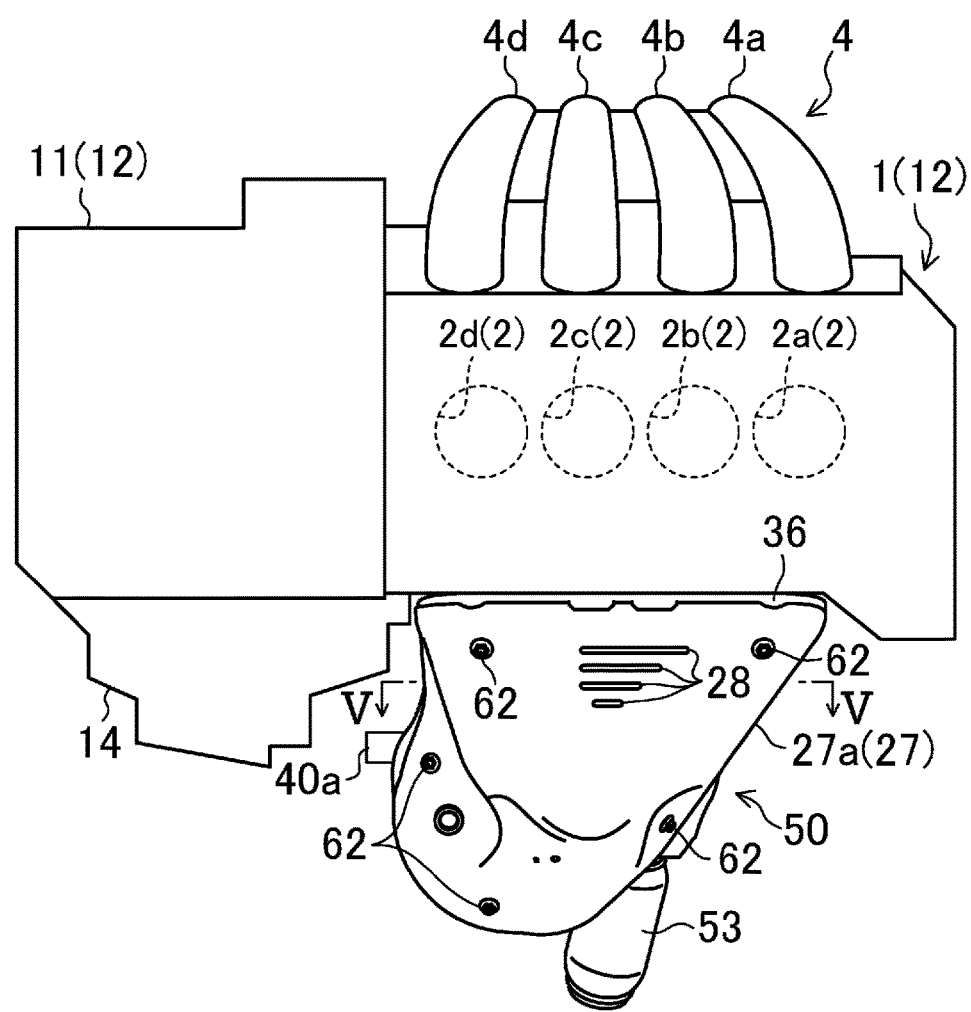
FIG. 1 is a plan view illustrating how to mount an exhaust system including an exhaust insulator structure for a multi-cylinder engine on a vehicle.
Figure 2:
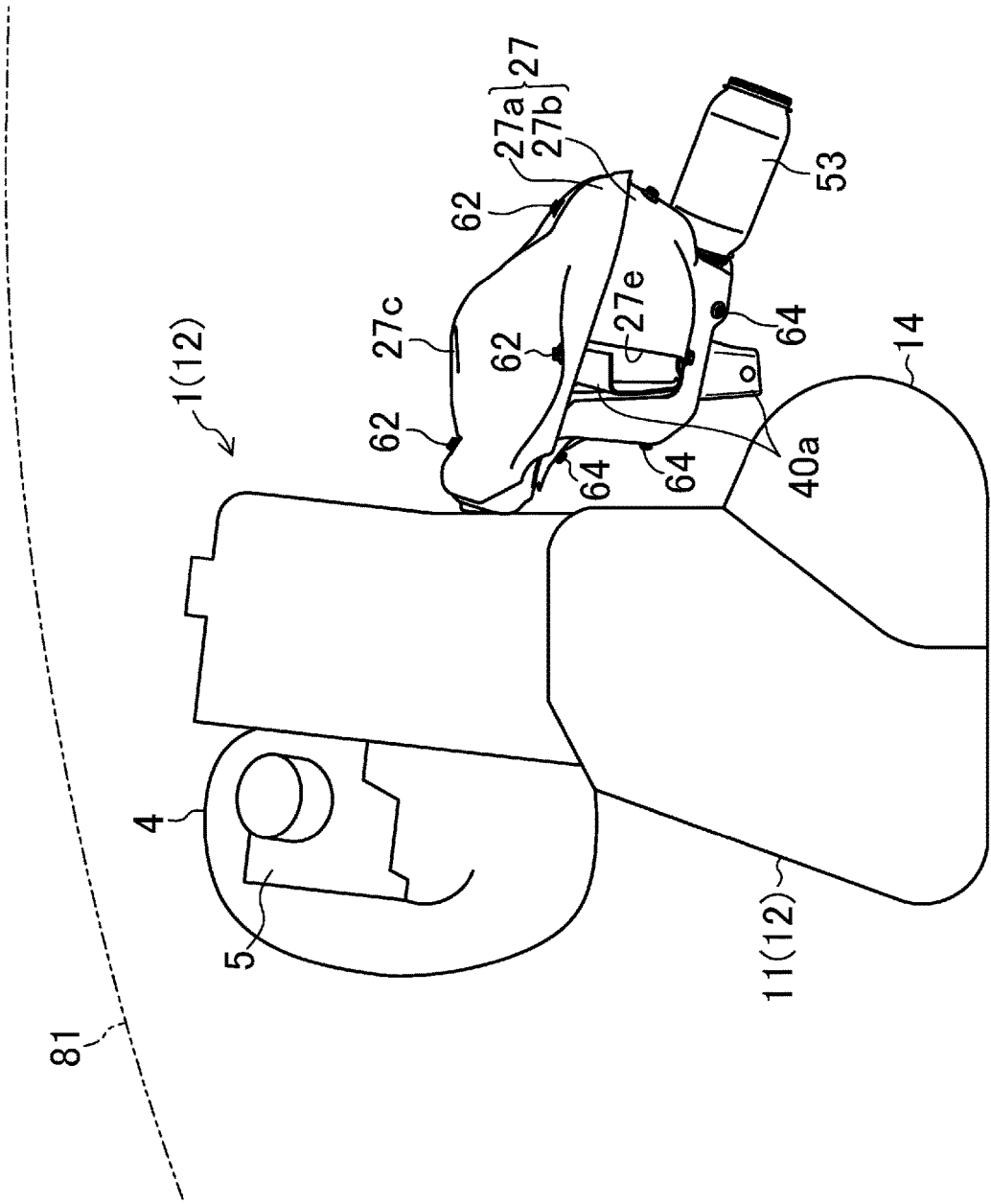
FIG. 2 is a side view illustrating the exhaust system and a power plant as viewed from a left side of the vehicle.

FIGS. 1 and 2 illustrate an exhaust system 50 for use in a multi-cylinder engine 1 (hereinafter simply referred to as an "engine 1") to which an exhaust insulator structure according to an exemplary embodiment is applied. This engine 1 is an in-line four-cylinder engine in which four columnar cylinders 2 are arranged in line. The engine 1 is mounted transversely in an engine compartment at the frontend of a vehicle such that the cylinder arrangement direction is parallel to the vehicle width direction (i.e., the right and left direction on the paper of FIG. 1). That is to say, this engine 1 is a transversely mounted engine. This engine 1 is arranged so as to be upwardly slanted toward the rear end of the vehicle. In the following description, the engine 1 and the exhaust system 50 are supposed to have already been mounted on a vehicle.

At one end in the cylinder arrangement direction (e.g., on the left end of the vehicle (corresponding to the left end in FIG. 1 as well) in this exemplary embodiment), the engine 1 is coupled to a transmission 11. The engine 1 and the transmission 11 together form a power plant 12. This transmission 11 is also mounted transversely such that their input and output shafts (not shown) extend in the vehicle width direction. The input shaft is coupled to the engine's 1 crankshaft extending in the vehicle width direction. The output shaft is coupled to a differential unit 14, which is arranged closer to the rear end of the vehicle than the transmission 11 is. Although not shown, right and left front wheel drive shafts to be coupled to right and left front wheels, respectively, extend from this differential unit 14 rightward and leftward in the vehicle width direction. In this exemplary embodiment, the vehicle is a front-engine, front-wheel-drive (FF) vehicle, of which the right and left front wheels are driven by the engine 1. In an alternative embodiment, however, the vehicle may also be a four-wheel drive vehicle as well.

As shown in FIG. 2, a hood 81 is arranged over the engine 1 to allow the user to access the engine compartment by opening and closing the hood 81. Although not illustrated, a striker to keep the hood 81 opened is provided at a front end of the hood 81. In addition, although not shown, either, this hood 81 is equipped with an acoustic insulation member to muffle the sound of the engine 1 running. The vibrations of the air and other annoying noise produced by the engine 1 running are muffled by the hood 81 and less likely transmitted to the outside of the vehicle.

An intake manifold 4 for introducing intake air into respective cylinders 2 of the engine 1 is further arranged closer to the frontend of the vehicle than the engine 1 is. This intake manifold 4 includes four branched inlet pipes 4a-4d respectively provided for the four cylinders 2 of the engine 1. These branched inlet pipes 4a-4d are arranged in a curvilinear pattern so as to surround a surge tank 5 extending in the cylinder arrangement direction (i.e., the vehicle width direction). The branched inlet pipes 4a-4d provided for the respective cylinders 2 are respectively connected to openings of inlet ports (not shown) of the respective cylinders 2 at a side surface of the engine 1 facing the frontend of the vehicle so as to communicate with the respective cylinders 2.

Figure 3:
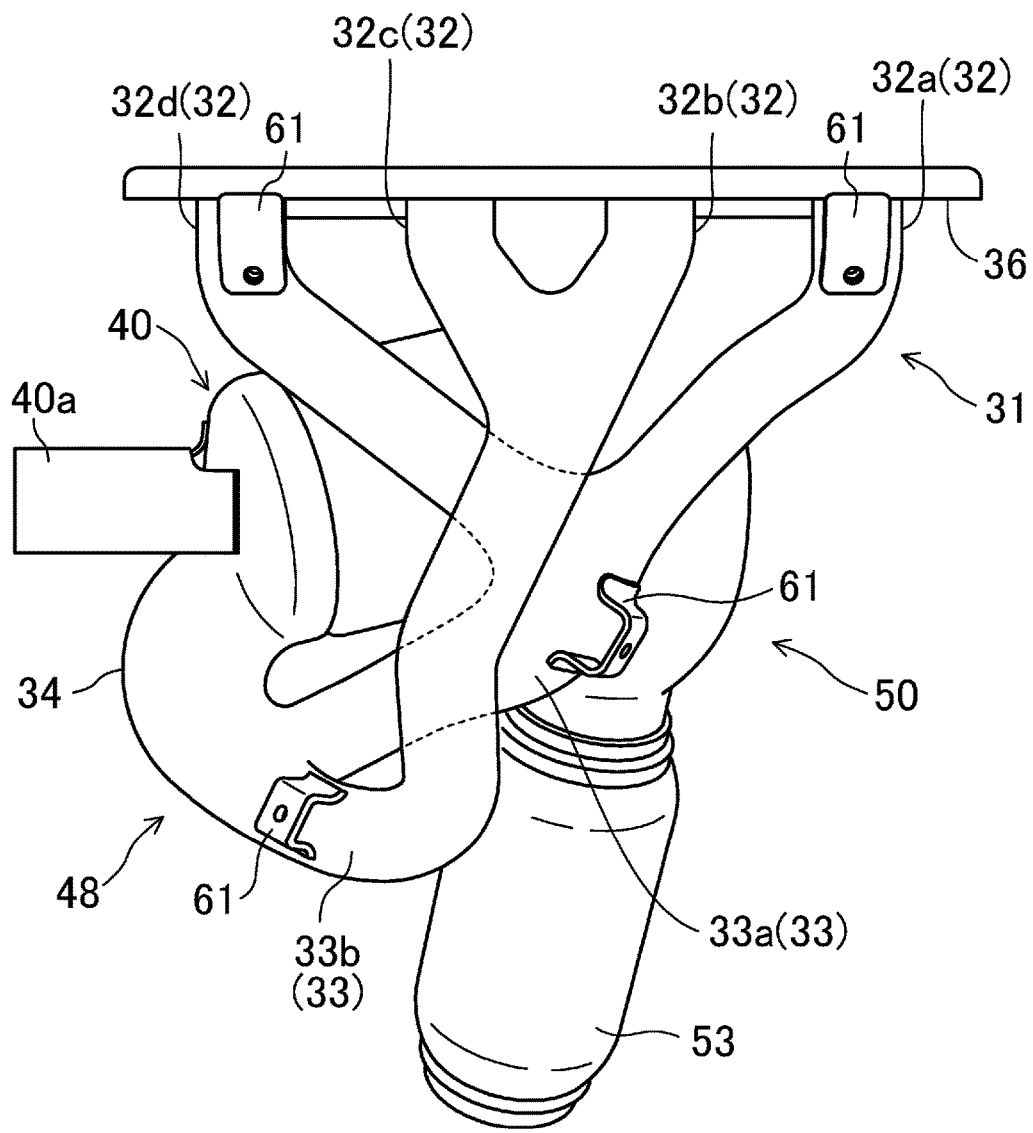
FIG. 3 is a plan view illustrating, with a heat insulator removed, exhaust gas upstream parts of the exhaust insulator structure and a divided pipe at the most upstream portion of a downstream exhaust pipe.
Figure 4:
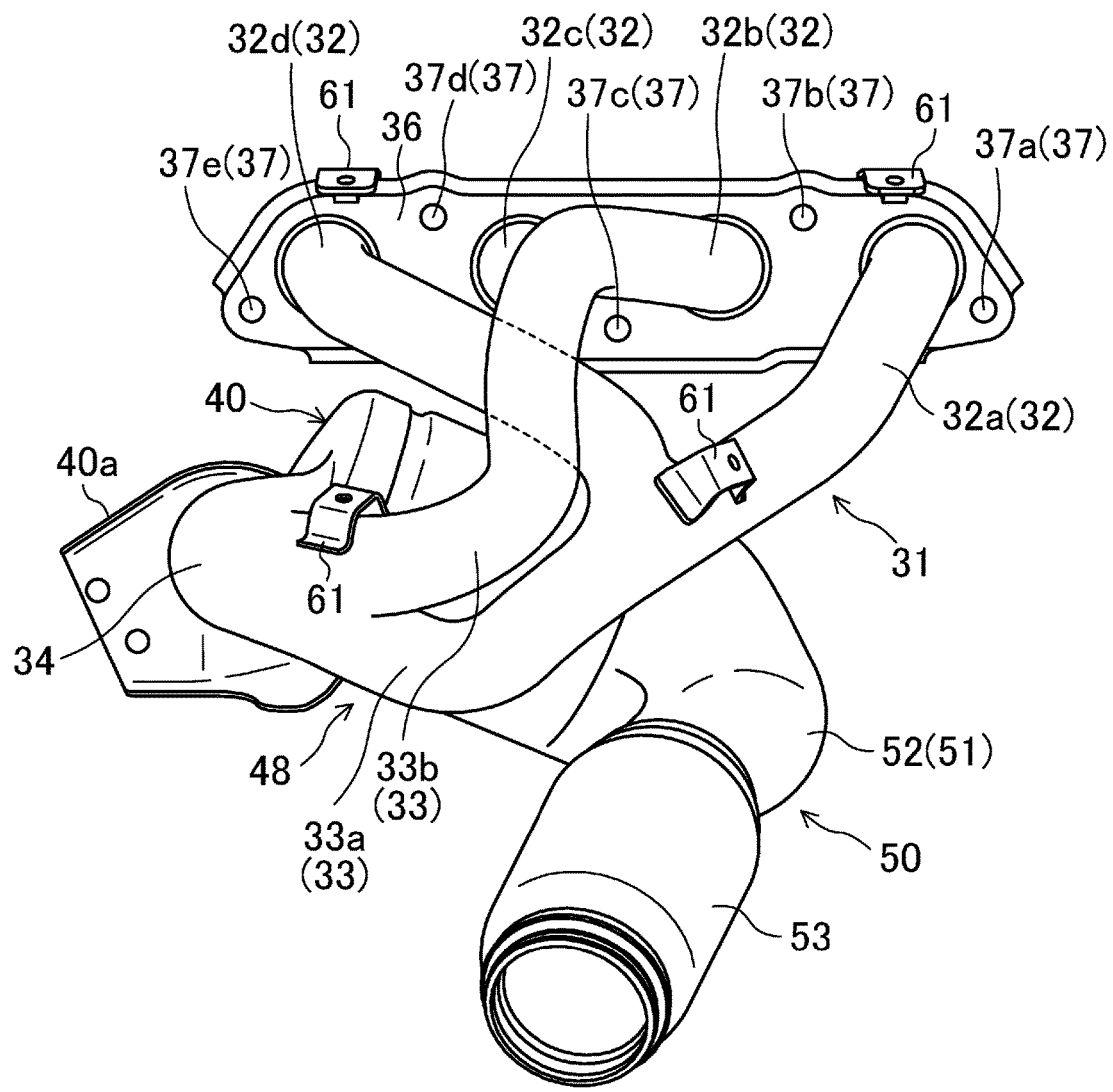
FIG. 4 is a perspective view illustrating, with the heat insulator removed, exhaust gas upstream parts of the exhaust insulator structure and the divided pipe at the most upstream portion of the downstream exhaust pipe.

On the other hand, as shown in FIGS. 3 and 4, the exhaust system 50 for discharging the exhaust gas released from the respective cylinders 2 in the engine 1 is arranged closer to the rear end of the vehicle than the engine 1 is. The exhaust system 50 includes an exhaust manifold 31, a direct catalyst 40 functioning as an exhaust gas purifier for the engine 1, and a downstream exhaust pipe 51, which are arranged in this order from an upstream point toward the downstream end of the exhaust gas. Also, as shown in FIGS. 5-8, this exhaust system 50 is housed in the engine compartment so as to be surrounded with a heat insulator 27. This exhaust system 50 and its insulator structure will now be described in detail.

First of all, the exhaust system 50 will be described with reference to FIGS. 3 and 4. The exhaust manifold 31 of the exhaust system 50 includes: four independent exhaust pipes 32 respectively communicating with the four cylinders 2 of the engine 1; two intermediate collecting pipes 33, each combining together associated two out of the four independent exhaust pipes 32; and a single last collecting pipe 34 formed by combining together those two intermediate collecting pipes 33. The direct catalyst 40 is connected to an exhaust gas downstream end of this last collecting pipe 34.

In the following description, the four cylinders 2 will be hereinafter referred to as first, second, third, and fourth cylinders 2a, 2b, 2c, and 2d, respectively, which are arranged in this order from one end of the vehicle (i.e., on the front end of the engine 1, in other words, the right end of the vehicle opposite from the transmission 11) toward the other end thereof (i.e., on the rear end of the engine 1, in other words, the left end of the vehicle with the transmission 11). Note that if there is no need to identify these cylinders 2a-2d, they may be hereinafter collectively referred to as "cylinders 2." Likewise, the independent exhaust pipes 32 communicating with the first through fourth cylinders 2a-2d, respectively, will be hereinafter referred to as first, second, third and fourth independent exhaust pipes 32a, 32b, 32c, and 32d, respectively. Note that if there is no need to identify these exhaust pipes 32a-32d, they may be hereinafter collectively referred to as "independent exhaust pipes 32."

A flange 36, extending in the vehicle width direction, is provided in common for all of those first through fourth independent exhaust pipes 32a-32d. The flange 36 is arranged to face the respective exhaust gas upstream ends of the first through fourth independent exhaust pipes 32a-32d and attach these pipes 32a-32d to one side surface of the engine 1 facing the rear end of the vehicle. Mounting this flange 36 onto that side surface of the engine 1 facing the rear end of the engine 1 allows the first through fourth independent exhaust pipes 32a-32d to communicate with the first through fourth cylinders 2a-2d, respectively. That is to say, the first through fourth independent exhaust pipes 32a-32d are respectively connected to the exhaust ports (not shown) of their associated cylinders 2, which are cut open through that side surface of the engine 1 facing the rear end of the vehicle, to communicate with the respective cylinders 2.

The flange 36 has a plurality of (e.g., five in this exemplary embodiment) fastening portions 37 to be fastened, with fastening members such as bolts, onto that side surface of the engine 1 facing the rear end of the vehicle. Each of these fastening portions 37 has a fastening member inserting hole into which a fastening member such as a bolt is inserted. In the following description, these five fastening members 37 will be hereinafter referred to as first, second, third, fourth, and fifth fastening portions 37a, 37b, 37c, 37d, and 37e, respectively, which are arranged in this order from the right end of the vehicle toward the left end thereof. Note that if there is no need to identify these fastening portions 37a-37e, they may be hereinafter collectively referred to as "fastening portions 37."

The first fastening portion 37a forms a part of the flange 36 located closer to one outer end in the vehicle width direction (i.e., the right end of the vehicle) than the first cylinder 2a is. The second fastening portion 37b forms another part of the flange 36 located between the first and second cylinders 2a and 2b. The third fastening portion 37c forms still another part of the flange 36 located between the second and third cylinders 2b and 2c. The fourth fastening portion 37d forms yet another part of the flange 36 located between the third and fourth cylinders 2c and 2d. The fifth fastening portion 37e forms yet another part of the flange 36 located closer to the other outer end in the vehicle width direction (i.e., the left end of the vehicle) than the fourth cylinder 2d is. These first through fifth fastening portions 37a-37e are arranged to form two rows of fastening portions extending in the vehicle width direction (i.e., the direction in which the cylinders are arranged in line) and spaced apart from each other in the height direction. Specifically, the upper row of fastening portions, consisting of the second and fourth fastening portions 37b and 37d, is located at a first level near the top end of the flange 36. On the other hand, the lower row of fastening portions, consisting of the first, third, and fifth fastening portions 37a, 37c, and 37e, is located at a second level near the bottom end of the flange 36. Also, these first through fifth fastening portions 37a-37e are arranged in a zigzag pattern such that each of the fastening portions 37 in the upper row is located between an associated pair of adjacent fastening portions 37 in the lower row.

The four cylinders 2 are classified into two groups of cylinders 2, each of the two groups being comprised of two cylinders 2 with mutually discontinuous exhaust strokes (i.e., expansion strokes). Each of the two intermediate collecting pipes 33 is formed by combining together two associated independent exhaust pipes 32 respectively communicating with the two cylinders 2 in an associated one of the two groups. Specifically, in this exemplary embodiment, the exhaust strokes are carried out in the order of the first, third, fourth, and second cylinders 2a, 2c, 2d, and 2b. Thus, the four cylinders 2 are classified into one group consisting of the first and fourth cylinders 2a and 2d and the other group consisting of the second and third cylinders 2b and 2c. Consequently, one intermediate collecting pipe 33 is formed by combining together the first and fourth independent exhaust pipes 32a and 32d communicating with the first and fourth cylinders 2a and 2d, respectively. The other intermediate collecting pipe 33 is formed by combining together the second and third independent exhaust pipes 32b and 32c communicating with the second and third cylinders 2b and 2c, respectively. In the following description, the intermediate collecting pipe 33 formed by combining together the first and fourth independent exhaust pipes 32a and 32d will be hereinafter referred to as a "first intermediate collecting pipe 33a." On the other hand, the intermediate collecting pipe 33 formed by combining together the second and third independent exhaust pipes 32b and 32c will be hereinafter referred to as a "second intermediate collecting pipe 33b." Note that if there is no need to identify these intermediate collecting pipes 33a and 33b, they may be hereinafter collectively referred to as "intermediate collecting pipes 33."

The first through fourth independent exhaust pipes 32a-32d extend generally toward the rear end of the vehicle from the side surface of the engine 1 facing the rear end of the vehicle (or strictly speaking, from the flange 36). Specifically, in a plan view, the first independent exhaust pipe 32a extends toward the rear end of the vehicle from that side surface of the engine 1 facing the rear end of the vehicle and then extends obliquely toward the left end and the rear end of the vehicle. In a plan view, the fourth independent exhaust pipe 32d extends toward the rear end of the vehicle from that side surface and then extends obliquely toward the right end and the rear end of the vehicle. The first and fourth independent exhaust pipes 32a and 32d are combined together at almost the same position in the vehicle width direction as the third fastening portion 37c to form the first intermediate collecting pipe 33a. Meanwhile, in a plan view, the second and third independent exhaust pipes 32b and 32c extend toward the rear end of the vehicle from that side surface of the engine 1 facing the rear end of the vehicle and then are inclined toward the rear end of the vehicle so as to come close to each other in the vehicle width direction and combined together at almost the same position in the vehicle width direction as the third fastening portion 37c to form the second intermediate collecting pipe 33b.

As shown in FIGS. 3 and 4, the second and third independent exhaust pipes 32b and 32c extend substantially horizontally toward the rear end of the vehicle to be combined together. On the other hand, the first and fourth independent exhaust pipes 32a and 32d are arranged to pass through a space under the second and third independent exhaust pipes 32b and 32c. That is to say, the first and fourth independent exhaust pipes 32a and 32d are sloped downward toward the rear end of the vehicle. Among other things, the first independent exhaust pipe 32a has its upstream portion steeply sloped downward. Thus, as shown in FIG. 4 in particular, a space is left vertically between first and second independent exhaust pipes 32a and 32b which is ample enough to allow a fastening tool to easily access the third fastening portion 37c. The fourth independent exhaust pipe 32d passes under the second intermediate collecting pipe 33b, which is located at substantially the same level as the second and third independent exhaust pipes 32b and 32c, to be combined with the first independent exhaust pipe 32a. Thus, the combining portion of the first and fourth independent exhaust pipes 32a and 32d (i.e., an exhaust gas upstream end of the first intermediate collecting pipe 33a) is located at a lower level than the combining portion of the second and third independent exhaust pipes 32b and 32c (i.e., an exhaust gas upstream end of the second intermediate collecting pipe 33b).

As shown in FIGS. 3 and 4, the second and third independent exhaust pipes 32b and 32c are shorter in length than first and fourth independent exhaust pipes 32a and 32d. Thus, the combining portion of the second and third independent exhaust pipes 32b and 32c is located closer to the frontend of the vehicle than that of the first and fourth independent exhaust pipes 32a and 32d is.

In a plan view, the first and second intermediate collecting pipes 33a and 33b extend in respective curvilinear patterns such that their exhaust gas downstream ends go toward one end in the vehicle width direction (e.g., toward the left end of the vehicle, or toward the transmission 11 in the vehicle width direction in this exemplary embodiment) and eventually are combined together, thus forming the last collecting pipe 34. More specifically, the first intermediate collecting pipe 33a extends in a curvilinear pattern from its exhaust gas upstream end toward the left end of the vehicle and then extends linearly toward the left end of the vehicle. On the other hand, the second intermediate collecting pipe 33b is sloped downward from its exhaust gas upstream end toward the rear end of the vehicle while passing over the first intermediate collecting pipe 33a, extends in a curvilinear pattern toward the left end of the vehicle, and then extends linearly toward the left end of the vehicle. Then, the first and second intermediate collecting pipes 33a and 33b are combined together at substantially the same position as the fourth cylinder 2d in the vehicle width direction, thereby forming the last collecting pipe 34.

In a plan view, the last collecting pipe 34 is curved such that its exhaust gas downstream end goes toward the frontend of the vehicle before being connected to the direct catalyst 40. A portion of this last collecting pipe 34 in the vicinity of its exhaust gas downstream end is curved toward the front end and right end of the vehicle. As a result, the last collecting pipe 34 has a curved shape such that its intermediate portion protrudes in the opposite direction from the direct catalyst 40 (i.e., toward the left end of the vehicle), as opposed to both ends thereof.

Figure 5:
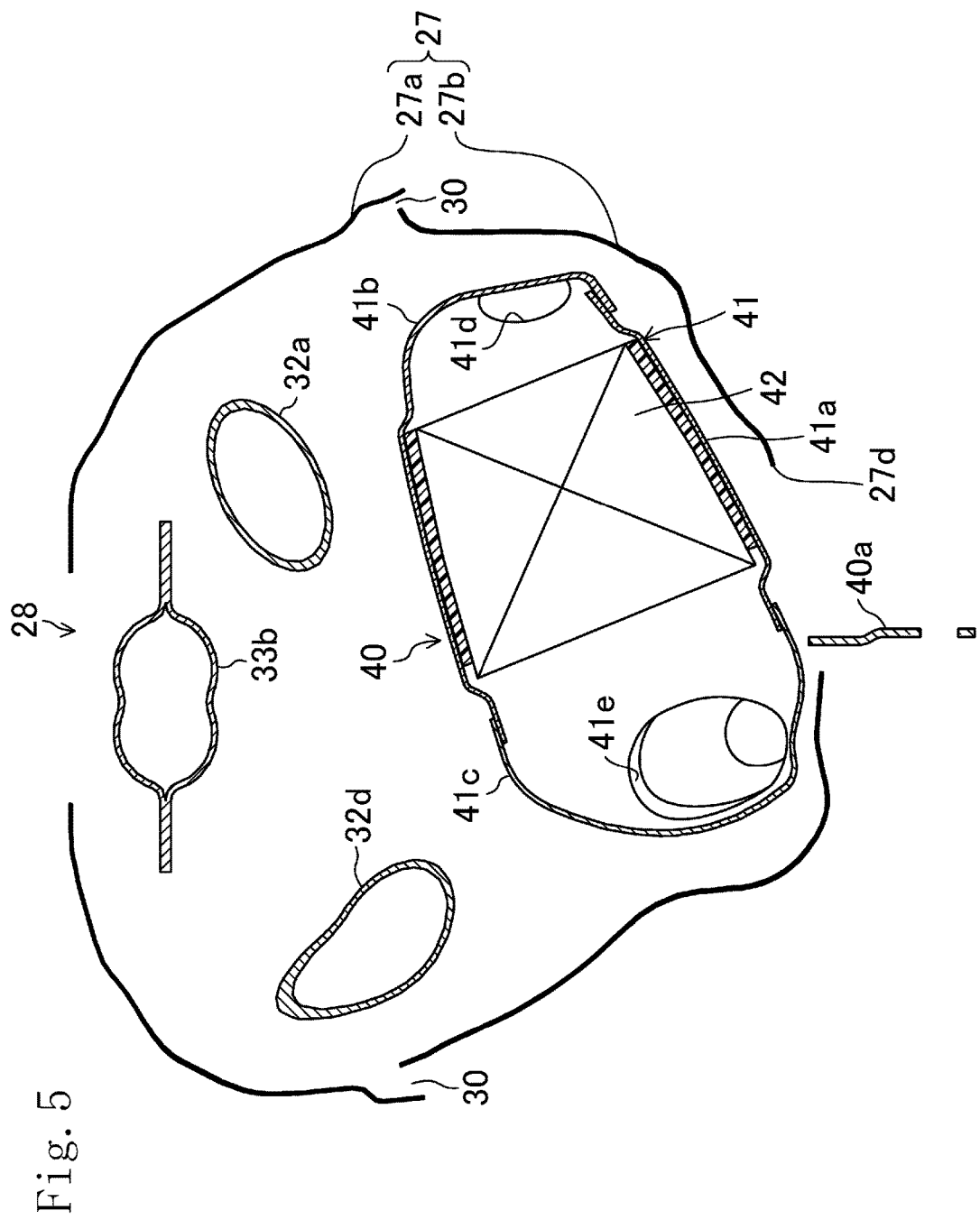
FIG. 5 is a cross-sectional view taken along the plane V-V shown in FIG. 1.

The direct catalyst 40 is arranged closer to the rear end of the vehicle than the engine 1 is such that in a plan view, the gas channel in the case 41 extends substantially in the vehicle width direction. Thus, the case 41 extends generally along that side surface of the engine 1 facing the rear end of the vehicle. Note that strictly speaking, in this exemplary embodiment, the case 41 (or the gas channel) extends toward the left end of the vehicle while slightly tilting toward the rear end of the vehicle. This arrangement is adopted to make the angle defined by the exhaust gas entering the case 41 with respect to an upstream member 41b (to be described later) thereof as close to 90 degrees as possible. Also, as shown in FIG. 5, the case 41 (gas channel) extends toward the right end of the vehicle (leftward in FIG. 5) so as to be sloped downward. The direct catalyst 40 (the case 41) is secured to a fixing member (not shown) with two brackets 40a.

Also, the direct catalyst 40 contains a catalyst 42 provided in the gas channel in a generally circular cylindrical case 41 as shown in FIG. 5. The case 41 includes a cylindrical (e.g., circular cylindrical in this exemplary embodiment) catalyst container 41a containing the catalyst 42, and an upstream member 41b and a downstream member 41c respectively covering the two openings of the catalyst container 41a at the exhaust gas upstream and downstream ends. The catalyst 42 is a three-dimensional catalyst, which is provided to purify HC and CO while the engine 1 is still cold, in particular. Thus, the direct catalyst 40 is provided at the exhaust gas upstream portion 48 of this exhaust system 50 (see FIG. 3).

The upstream member 41b of the case 41 has a communication hole 41d to communicate with the exhaust gas flow when connected to the last collecting pipe 34. Likewise, the downstream member 41c has a communication hole 41e to communicate with the exhaust gas flow when connected to the last collecting pipe 34.

The downstream exhaust pipe 51 is connected to the downstream member 41c of the case 41 of the direct catalyst 40. This downstream exhaust pipe 51 is provided to be directed from a portion connected to the direct catalyst 40 (i.e., the exhaust gas upstream end of the downstream exhaust pipe 51) toward a tunnel opening provided at a middle of a bottom portion of a dash panel (not shown) in the vehicle width direction. That is to say, in a plan view, the downstream exhaust pipe 51 extends from its exhaust gas upstream end toward the rear end of the vehicle so as to be sloped toward the left end of the vehicle, further extends from a point before the tunnel opening toward the rear end of the vehicle, and then enters a tunnel of a floor panel.

The downstream exhaust pipe 51 is actually comprised of a plurality of pipes 52 that have been divided along the length thereof as shown in FIG. 4. In FIG. 4, however, only the most upstream one 52 of those divided pipes, which is located within the engine compartment, is shown with the illustration of the other divided pipes 52 omitted.

The most upstream divided pipe 52 of the downstream exhaust pipe 51 is provided with a flexible joint 53. This flexible joint 53 is provided to absorb not only the vibration of the engine 1 but also the vibration of the exhaust gas upstream portion 48, involved with the vibration of the engine 1, and prevent these vibrations from being propagated to any portion of the downstream exhaust pipe 51 located downstream of the flexible joint 53 in the exhaust gas flowing direction. The number of the flexible joints 53 to provide does not have to be one. Alternatively, a plurality of flexible joints 53 may be arranged in series at some intervals along the length of the downstream exhaust pipe 51.

Next, the configuration of the heat insulator 27 will be described with reference to FIGS. 5-9. The heat insulator 27 is used to check a decrease in the temperature of the exhaust system 50. Use of this heat insulator 27 allows the exhaust manifold 31 to be heated quickly even when the engine 1 is cold. Thus, the temperature of the direct catalyst 40 may be quickly raised to the catalyst activation temperature. In addition, once the former temperature has reached the latter, this heat insulator 27 may prevent the temperature of the direct catalyst 40 from falling easily, thus alleviating the decline in the exhaust gas purification ability.

As shown in FIGS. 2, 5, 8, and 9, the heat insulator 27 is comprised of: an upper cover 27a that covers an upper surface portion and side surface portions of the exhaust system 50; and a lower cover 27b that covers a lower surface portion and the rest of the side surface portions of the exhaust system 50.

Figure 6:
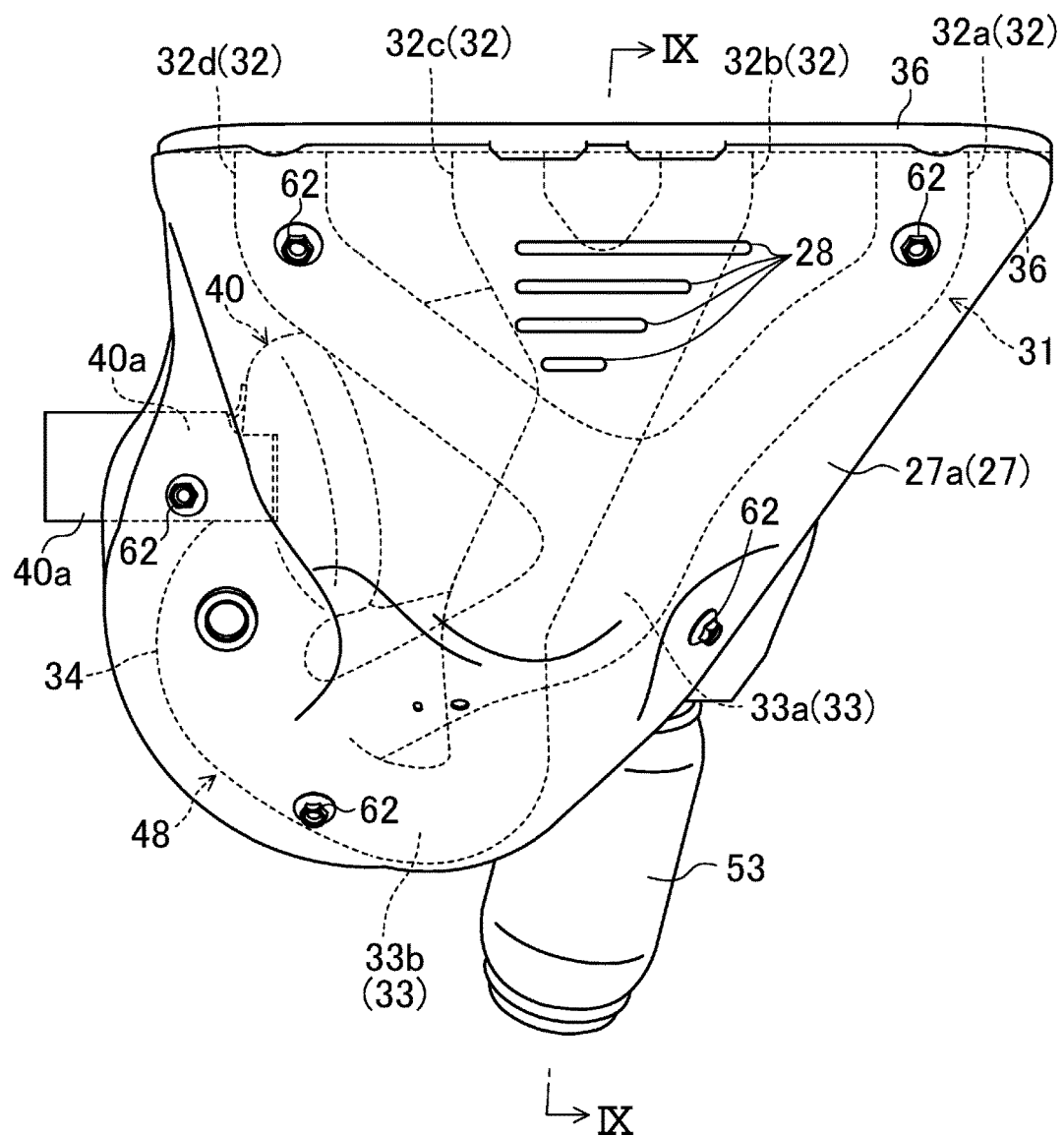
FIG. 6 is a plan view illustrating an upper cover of the heat insulator of the exhaust insulator structure.
Figure 9:
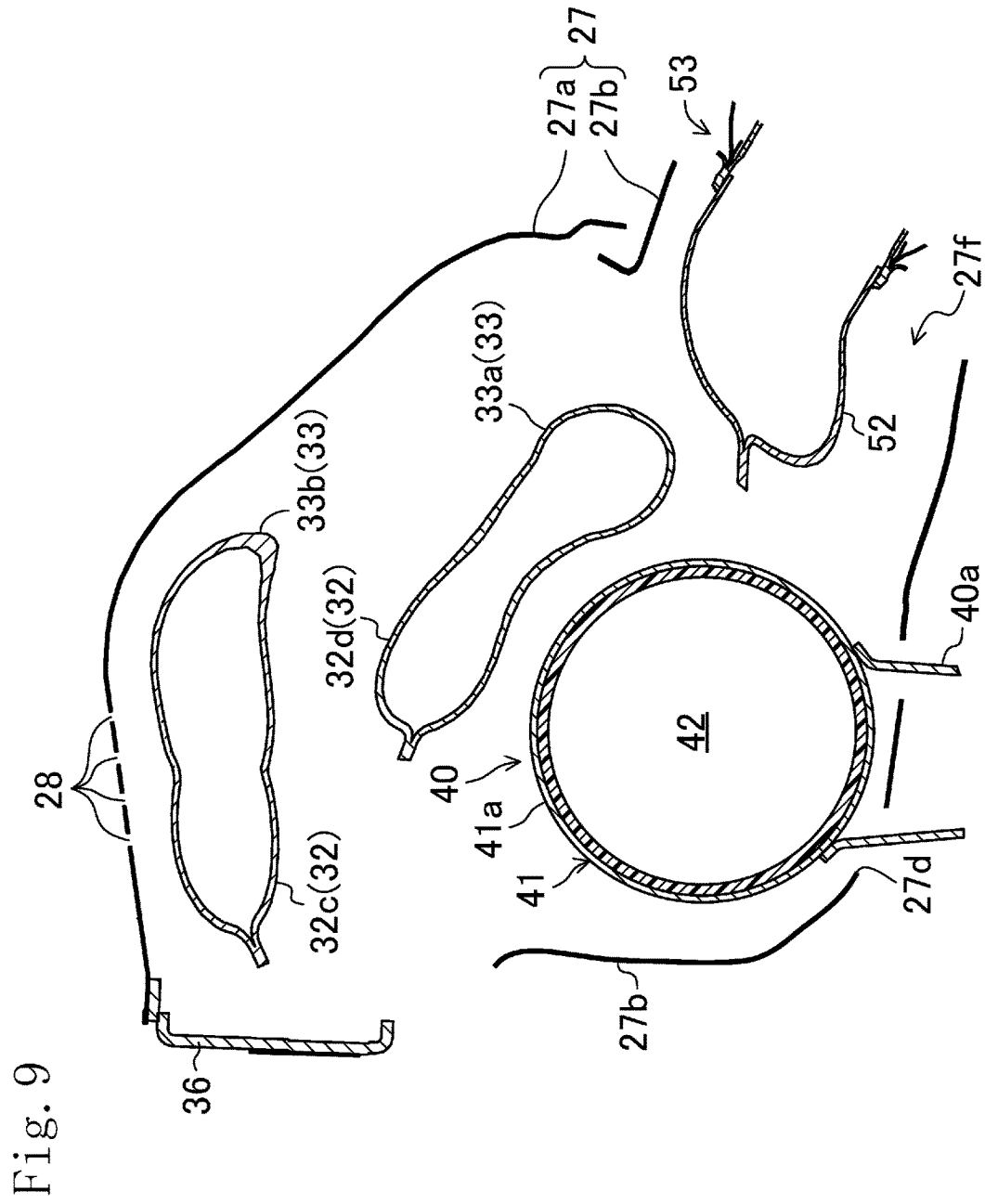
FIG. 9 is a cross-sectional view taken along the plane IX-IX shown in FIG. 6.

The upper cover 27a has a curved outer peripheral surface that extends along an upper surface portion of the exhaust manifold 31 and side surface portions thereof in the vehicle width direction. More specifically, in a plan view, a side surface portion of the upper cover 27a on the left side of the vehicle (corresponding to the left-hand side on the paper of FIG. 6) extends linearly toward the rear end of the vehicle along the vehicle's left-hand side portion near an exhaust gas upstream end of the fourth independent exhaust pipe 32d. Next, the side surface portion extends curvilinearly along a portion of the last collecting pipe 34 located on the left side of the vehicle so as to expand toward the left end of the vehicle. Then, the side surface portion extends curvilinearly toward the right end of the vehicle as the point of interest comes closer to the rear end of the vehicle, as shown in FIG. 6. On the other hand, a side surface portion of the upper cover 27a on the right side of the vehicle (corresponding to the right-hand side on the paper of FIG. 6) extends toward the rear end of the vehicle along the vehicle's right-hand side portion near the first independent exhaust pipe 32a so as to tilt toward the left end of the vehicle. After that, the side surface portion extends curvilinearly toward the left end of the vehicle as the point of interest comes closer to the rear end of the vehicle, as shown in FIG. 6. Furthermore, as shown in FIG. 9, an upper surface portion of the upper cover 27a defines, in a side view, a horizontal plane portion 27c that extends substantially horizontally from the flange 36 through an exhaust gas upstream end of the second intermediate collecting pipe 33b. The upper surface portion of the upper cover 27a extends along respective upper surface portions of the second and third independent exhaust pipes 32b and 32c and an upper surface portion of the second intermediate collecting pipe 33b near an exhaust gas upstream end thereof in a side view. Then, the upper surface portion of the upper cover 27a extends curvilinearly toward the rear end of the vehicle from a point corresponding to the exhaust gas upstream end of the second intermediate collecting pipe 33b (i.e., from an end of the horizontal plane portion 27c closer to the rear end of the vehicle) so as to tilt downward toward the rear end of the vehicle along the upper surface portion of the second intermediate collecting pipe 33b.

The horizontal plane portion 27c at the upper surface of the upper cover 27a has a plurality of (e.g., four in this exemplary embodiment) elongate rectangular slits 28 extending parallel to each other in the vehicle width direction and arranged in the front and back direction of the vehicle. As shown in FIG. 9, with the upper cover 27a attached to the exhaust system 50, these slits 28 are arranged to face the second and third independent exhaust pipes 32b and 32c and a combining portion where the second and third independent exhaust pipes 32b and 32c are combined together. These slits 28 serve as an opening to let the air blowing against the vehicle traveling into the heat insulator 27. The air blowing into the heat insulator 27 through these slits 28 lashes against, and thereby cools down, the second and third independent exhaust pipes 32b and 32c, the combining portion where the second and third independent exhaust pipes 32b and 32c are combined together, and surrounding regions. In addition, any engine sound leaking through the slits 28 cut through the upper surface portion (i.e., the horizontal plane portion 27c) of the upper cover 27a is absorbed by an acoustic insulation provided for the hood 81 (see FIG. 2). This significantly reduces the leakage of the engine sound through the slits 28 of the heat insulator 27.

As shown in FIG. 6, the upper cover 27 is mounted onto the exhaust system 50 by fastening bolts 62 at multiple points (e.g., at five points in FIG. 6). More specifically, as shown in FIGS. 3 and 4, upper cover brackets 61 are fixed (e.g., welded) onto two points on the flange 36 corresponding to the first and fourth cylinders 2a and 2d, near an exhaust gas upstream end of the first intermediate collecting pipe 33a, near an exhaust gas downstream end of the second intermediate collecting pipe 33b, and an exhaust gas downstream end of the last collecting pipe 34. Meanwhile, the upper cover 27a has bolt holes (not shown) at respective points to face these upper cover brackets 61. Mounting the upper cover 27a onto the exhaust system 50 is done by positioning the upper cover 27a such that the respective bolt holes face their associated upper cover brackets 61 and then fastening bolts 62 onto the upper cover brackets 61 through the bolt holes.

Figure 7:
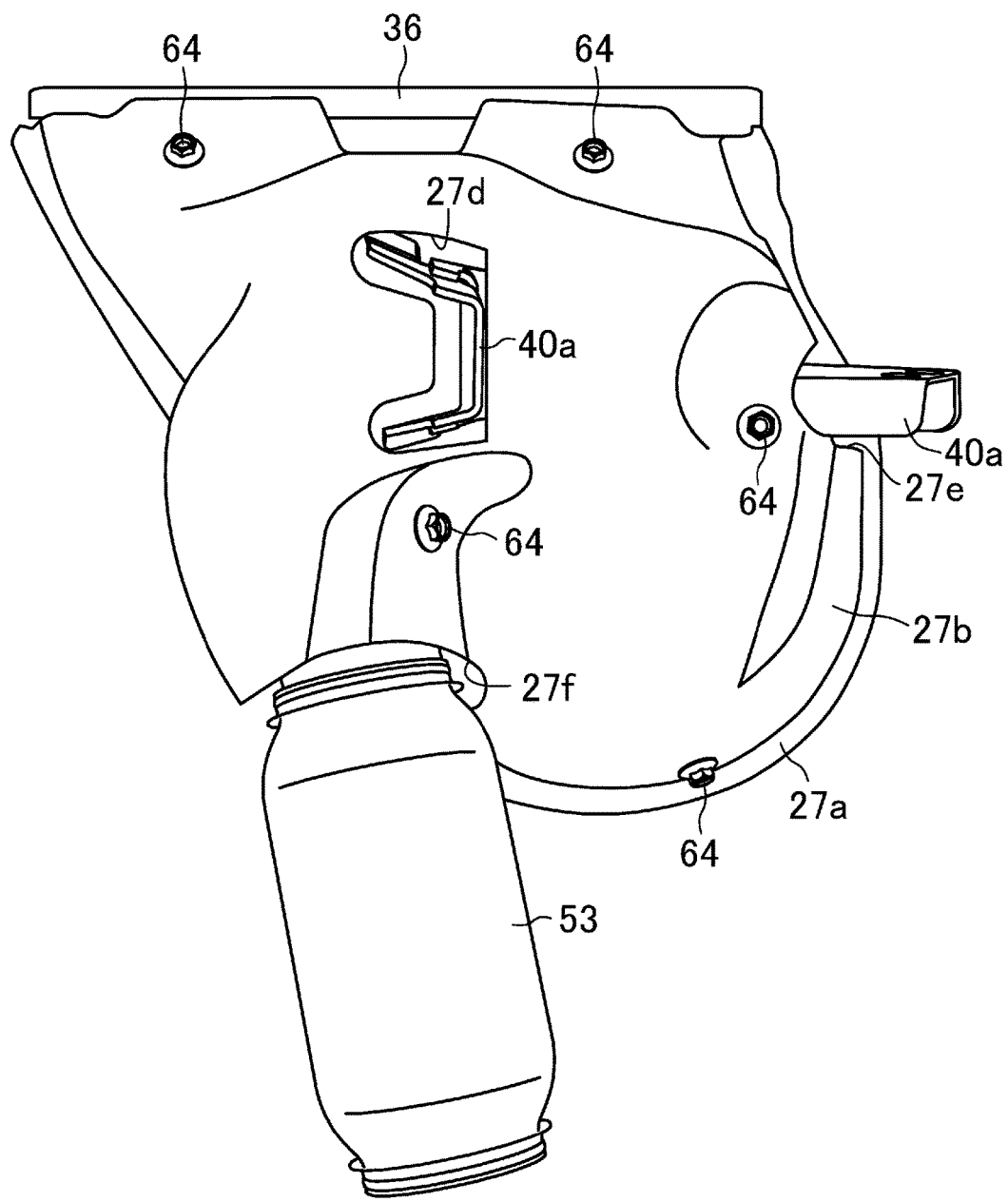
FIG. 7 is a bottom view illustrating a lower cover of the heat insulator of the exhaust insulator structure.
Figure 8:
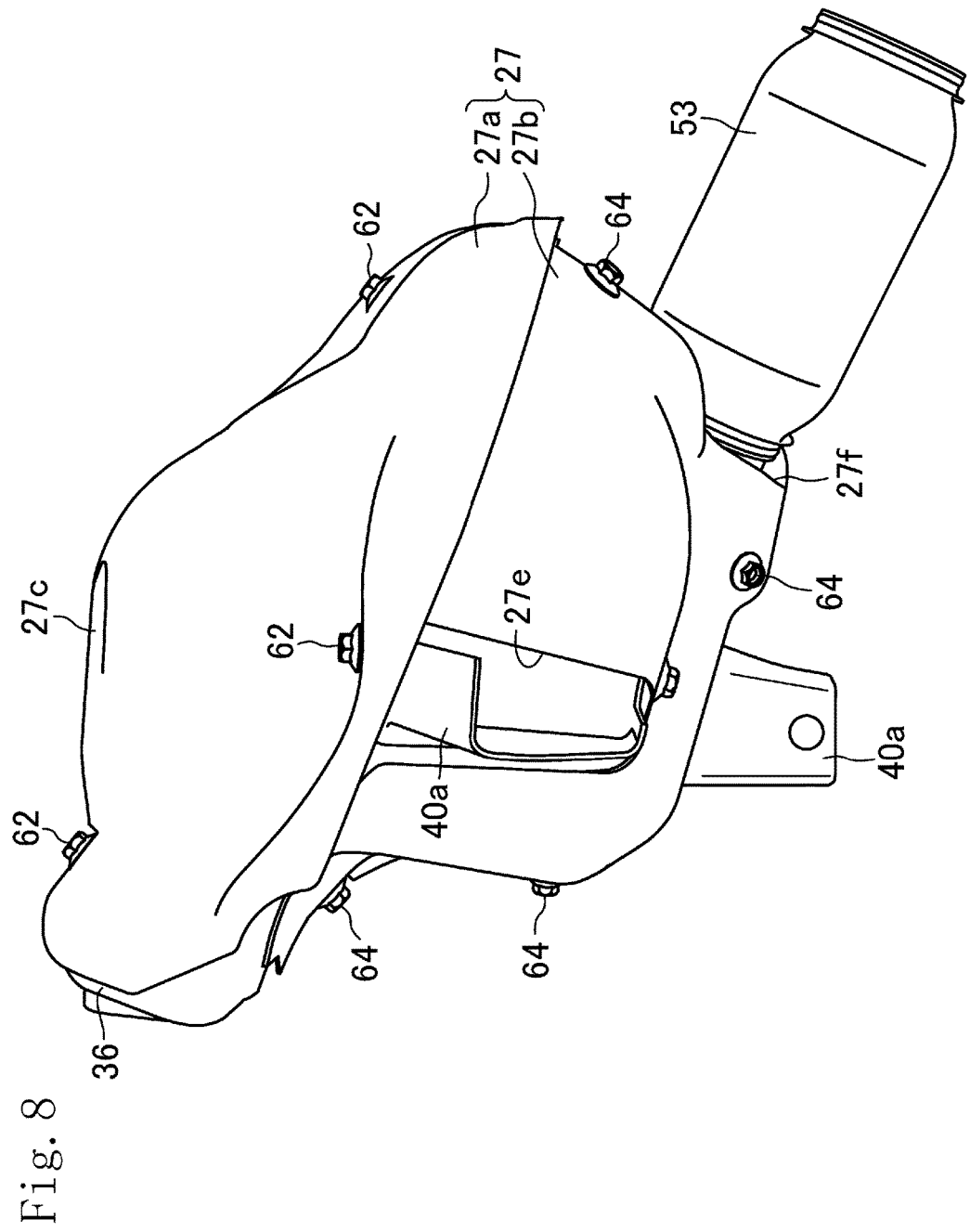
FIG. 8 is a side view illustrating the heat insulator of the exhaust insulator structure as viewed from a left side of the vehicle.

The lower cover 27b has an outer peripheral surface that extends curvilinearly along a lower surface portion of the exhaust manifold 31, a lower surface portion of the direct catalyst 40, and both side surface portions of the direct catalyst 40 in the vehicle width direction. More specifically, in a bottom view shown in FIG. 7, a side surface portion of the lower cover 27b on the left side of the vehicle (corresponding to the right-hand side on the paper of FIG. 7) extends curvilinearly along a portion of the last collecting pipe 34 located on the left side of the vehicle so as to expand toward the left end of the vehicle. Then, the side surface portion extends curvilinearly toward the right end of the vehicle as the point of interest comes closer to the rear end of the vehicle, as shown in FIG. 7. On the other hand, a side surface portion of the lower cover 27b on the right side of the vehicle (corresponding to the left-hand side on the paper of FIG. 7) extends toward the rear end of the vehicle along the vehicle's right-hand side portion near the first independent exhaust pipe 32a so as to tilt toward the left end of the vehicle. After that, the side surface portion extends curvilinearly along the downstream member 41c of the case 41 of the direct catalyst 40 toward the rear end of the vehicle so as to expand toward the right end of the vehicle. Furthermore, as shown in FIGS. 8 and 9, a lower surface portion of the lower cover 27b has a generally U-shape to extend along a lower portion of the case 41 of the direct catalyst 40.

Furthermore, as shown in FIGS. 7 and 9, the lower surface portion of the lower cover 27b has a generally rectangular lower surface tunnel portion 27d. A side surface portion of the lower cover 27b on the left side of the vehicle (i.e., on the right-hand side of FIG. 7) has a side surface tunnel portion 27e (shown only in FIG. 7). Another portion of the lower cover 27b facing the rear end of the vehicle has a rear surface tunnel portion 27f. The lower surface tunnel portion 27d and the side surface tunnel portion 27e are provided to allow a bracket 40a for the direct catalyst 40 (case 41) to pass through and reach outside of the heat insulator 27. On the other hand, the rear surface tunnel portion 27f is provided to allow the downstream exhaust pipe 51 (see FIG. 4) extending from the direct catalyst 40 to pass through and reach outside of the heat insulator 27. In this case, with the lower cover 27b mounted to the exhaust system 50, the bracket 40a extending toward the left end of the vehicle is located in a part of the side surface tunnel portion 27e closer to the frontend of the vehicle.

The lower surface tunnel portion 27d, the side surface tunnel portion 27e, and the rear surface tunnel portion 27f also play the role of allowing the air blowing into the heat insulator 27 through the slits 28 to go out of the heat insulator 27. That is to say, the air blowing against the vehicle enters the heat insulator 27 through the slits 28 and leaves the heat insulator 27 through the lower surface tunnel portion 27d and other tunnel portions, thus passing by the second and third independent exhaust pipes 32b and 32c, a combining portion where the second and third independent exhaust pipes 32b and 32c are combined together, and surrounding regions while cooling them. In addition, as described above, the bracket 40a extending toward the left end of the vehicle is located in a part of the side surface tunnel portion 27e closer to the frontend of the vehicle, thus letting the air blowing against the vehicle less easily into the heat insulator 27 through the side surface tunnel portion 27e.

As shown in FIG. 7, the lower cover 27b is mounted onto the exhaust system 50 by fastening bolts 64 at multiple points (e.g., at five points in FIG. 7). More specifically, as shown in FIGS. 3 and 4, lower cover brackets (not shown) are fixed (e.g., welded) onto the respective lower surfaces of the flange 36 and exhaust manifold 31. Meanwhile, the lower cover 27b has bolt holes (not shown) at respective points to face these lower cover brackets. Mounting the lower cover 27b onto the exhaust system 50 is done by fastening bolts 64 onto the lower cover brackets through the bolt holes.

Furthermore, as shown in FIGS. 5 and 9, with the heat insulator 27 mounted onto the exhaust system 50, the upper and lower covers 27a and 27b do not contact with each other. Specifically, when the upper and lower covers 27a and 27b are attached to the exhaust system 50, the lower end of the upper cover 27a is located closer to the outer end of the vehicle than the upper end of the lower cover 27b is, and a gap 30 (see FIG. 5) is left between the lower end of the upper cover 27a and the upper end of the lower cover 27b. Just like the lower surface tunnel portion 27d and other tunnel portions, this gap 30 also plays the role of allowing the air blowing into the heat insulator 27 through the slits 28 to go out of the heat insulator 27.

The engine 1 is able to switch its mode of operation from an all-cylinder operation in which all of the four cylinders 2 are activated to a cylinder-cutoff operation in which the two cylinders in one of the two groups of cylinders are deactivated and only the two cylinders in the other group are activated, or vice versa. In this exemplary embodiment, the first and fourth cylinders 2a and 2d serve as idle cylinders to be deactivated while the engine 1 is performing the cylinder-cutoff operation, and the second and third cylinders 2c and 2d serve as active cylinders to be activated during the cylinder-cutoff operation. That is to say, in this exemplary embodiment, the first independent exhaust pipe 32a communicating with the first cylinder 2a and the fourth independent exhaust pipe 32d communicating with the fourth cylinder 2d correspond to the idle-cylinder-connected independent exhaust pipes. The first intermediate collecting pipe 33a corresponds to the idle-cylinder-connected intermediate collecting pipe. The second independent exhaust pipe 32b communicating with the second cylinder 2b and the third independent exhaust pipe 32c communicating with the third cylinder 2c correspond to the active-cylinder-connected independent exhaust pipes. The second intermediate collecting pipe 33b corresponds to the active-cylinder-connected intermediate collecting pipe. Also, in the exhaust manifold 31, a piping set comprised of the first and fourth independent exhaust pipes 32a and 32d and the first intermediate collecting pipe 33a corresponds to the idle-cylinder-connected branched exhaust piping, and a piping set comprised of the second and third independent exhaust pipes 32b and 32c and the second intermediate collecting pipe 33b corresponds to the active-cylinder-connected branched exhaust piping.

In this exemplary embodiment, not only the injection of a fuel from fuel injection valves and the supply of electricity to an ignition plug to ignite the air-fuel mixture but also the opening and closing operation of inlet and exhaust valves are stopped in the first and fourth cylinders 2a and 2d of the engine 1, thereby performing the cylinder-cutoff operation. The opening and closing of the inlet and exhaust valves may be stopped by a known valve stop mechanism (not shown; see, for example, U.S. 2015/053174 A1 and U.S. 2015/053175 A1). Such a valve stop mechanism may be provided either for a supporting member (such as a rush adjuster) arranged at the center of rocking of a rocker arm to support the rocker arm or for the rocker arm itself. The rocker arm may be interposed so as to rock between a rotating cam and a valve.

The valve stop mechanism provided for the rush adjuster is configured such that an upper part of the rush adjuster is movable relative to a lower part thereof. Regulating its relative movement while the valve stop mechanism is not operating allows the upper part of the rush adjuster to function as a fulcrum of rocking of the rocker arm and makes the rotating cam downwardly press a roller provided for the rocker arm, thus causing the rocker arm to rock, press the valve downward, and open it. On the other hand, while the valve stop mechanism is operating, the upper part of the rush adjuster moves relative to the lower part thereof. Thus, making the rotating cam press the roller downward allows the top of the valve to function as the fulcrum of rocking of the rocker arm, thus causing the rocker arm to press the upper part of the rush adjuster downward with the valve kept closed.

Also, the valve stop mechanism provided for the rocker arm makes the roller movable in the pressing direction relative to the rocker arm. While the valve stop mechanism is not operating, the relative movement is regulated. On the other hand, while the valve stop mechanism is operating, the roller moves relative to the rocker arm. Thus, making the rotating cam press the roller allows the roller to move relative to the rocker arm, thereby keeping the rocker arm from rocking.

Note that the opening and closing operation of the inlet and exhaust valves do not always have to be stopped in the valve stop mechanism. Alternatively, only the supply of electricity to the ignition plug may be stopped.

In this exemplary embodiment, the engine 1 performs the cylinder-cutoff operation while running in a predetermined operating range and performs the all-cylinder operation while running in any other operating range. In this exemplary embodiment, the predetermined operating range may be a range in which the load on the engine 1 is equal to or smaller than a predetermined load (i.e., a range corresponding to low- to medium-load regions). Note that while the engine 1 is in an extremely cold mode in which the temperature of cooling water for the engine 1 (hereinafter referred to as an "engine water temperature") is equal to or lower than a predetermined temperature, the all-cylinder operation is performed even if the engine 1 is running in the predetermined operating range. On the other hand, if the engine water temperature is higher than the predetermined temperature, the cylinder-cutoff operation is always performed as long as the engine 1 is running in the predetermined operating range, no matter whether the engine 1 is cold or hot.

While the engine 1 is performing the cylinder-cutoff operation, failure to conduct the heat of the exhaust gas released from the active cylinders (i.e., the second and third cylinders 2b and 2c) to the direct catalyst 40 efficiently enough would make it difficult to raise the temperature of the direct catalyst 40 to a catalyst activation temperature early while the engine 1 is still cold. In addition, in such a situation, the temperature of the direct catalyst 40 that has once reached or exceeded the catalyst activation temperature could drop to less than the catalyst activation temperature if the cylinder-cutoff operation is continued.

In this exemplary embodiment, the second and third independent exhaust pipes 32b and 32c (i.e., active-cylinder-connected independent exhaust pipes) are shorter in length than the first and fourth independent exhaust pipes 32a, 32d (i.e., idle-cylinder-connected exhaust pipes) as described above. This allows the heat of the exhaust gas released from the active cylinders (i.e., the second and third cylinders 2b, 2c) to be conducted efficiently to the direct catalyst 40 while the engine 1 is performing the cylinder-cutoff operation. Thus, shortening the length of the second and third independent exhaust pipes 32b, 32c minimizes the quantity of heat dissipated from the surface of the second and third independent exhaust pipes 32b, 32c. This allows the heat of the exhaust gas released from the active cylinders to be conducted efficiently to the direct catalyst 40.

On the other hand, the active cylinders (e.g., the second and third cylinders 2b and 2c in this embodiment) are activated during both of the all-cylinder and cylinder-cutoff operations, and therefore, are always activated as long as the engine 1 is up and running. That is why when a heavy load is imposed on the engine 1 (e.g., when the vehicle is traveling at high speeds), a heavier thermal load is put on the active cylinders than on the idle cylinders (e.g., the first and fourth cylinders 2a and 2d in this embodiment), and therefore, tends to bring pipes communicating with those active cylinders in the exhaust manifold 31, or active-cylinder-connected branched exhaust piping (comprised of the second and third independent exhaust pipes 32b and 32c and the second intermediate collecting pipe 33b) to an elevated temperature. Particularly when the lengths of the second and third independent exhaust pipes 32b and 32c are shortened or a heat insulator 27 is provided to cover the exhaust manifold 31 as is done in this exemplary embodiment, the temperature of the active-cylinder-connected branched exhaust piping becomes too high to cool the exhaust gas flowing through the active-cylinder-connected branched exhaust piping sufficiently in the exhaust manifold 31. As a result, an exhaust gas at a temperature exceeding the maximum allowable temperature of the direct catalyst 40 enters the direct catalyst 40. In that case, the temperature of the catalyst 42 in the direct catalyst 40 will rise to a temperature exceeding the upper limit of the catalyst activation temperature, thus possibly undermining the exhaust gas purification ability of the direct catalyst 40. Note that the maximum allowable temperature of the direct catalyst 40 is approximately equal to or less than the upper limit of the catalyst activation temperature of the catalyst 42 in the direct catalyst 40.

Thus, according to this exemplary embodiment, a portion of the heat insulator 27 located near the active-cylinder-connected branched exhaust piping (comprised of the second and third independent exhaust pipes 32b and 32c and the second intermediate collecting pipe 33b in this embodiment), i.e., a portion of the upper cover 27a facing the active-cylinder-connected branched exhaust piping, has slits 28 that let air blowing against a vehicle traveling into the heat insulator 27. This allows, while the vehicle is traveling at high speeds, for example, the air blowing against the vehicle to enter the heat insulator 27 through the slits 28 to lash directly against, and cool down, the active-cylinder-connected branched exhaust piping, thus preventing the active-cylinder-connected branched exhaust piping from generating too much heat. In addition, providing the slits 28 to face the active-cylinder-connected branched exhaust piping prevents the air blowing against the vehicle traveling from directly lashing against the idle-cylinder-connected branched exhaust piping (comprised of the first and fourth independent exhaust pipes 32a and 32d and the first intermediate collecting pipe 33a), which are pipes communicating with the idle cylinders (e.g., the first and fourth cylinders 2a and 2d). This also prevents the idle-cylinder-connected branched exhaust piping, which is deactivated and tends to be cooled while the engine 1 is performing the cylinder-cutoff operation, from being further cooled by the air blowing against the vehicle traveling. This not only prevents a portion of the exhaust manifold from generating excessive heat but also checks a decrease in the temperature of the overall exhaust manifold at a time.

With this regard, the upper cover slits 28 cut through the upper cover 27a of the heat insulator 27 could prevent the exhaust manifold 31 from raising its temperature easily while the engine 1 is cold. In general, however, while the engine 1 is still cold, the vehicle is not traveling. Also, even if the vehicle is traveling while the engine 1 is cold, its speed should be so low that almost no air should blow against the vehicle. That is why the upper cover 27a with the slits 28 does not curb the rise in the temperature of the exhaust manifold 31 more significantly than an upper cover with no slits 28.

Furthermore, in this exemplary embodiment, the active-cylinder-connected independent exhaust pipes (e.g., the second and third independent exhaust pipes 32b and 32c) are arranged to pass through a space over the idle-cylinder-connected independent exhaust pipes (i.e., the first and fourth independent exhaust pipes 32a and 32d). This allows the air blowing into the heat insulator 27 through the slits 28 while the vehicle is traveling to more easily lash against, and more efficiently cool, the active-cylinder-connected branched exhaust piping.

Furthermore, in this exemplary embodiment, the direct catalyst 40 is located under the idle-cylinder-connected independent exhaust pipes as shown in the cross-sectional view of FIG. 5. Thus, the idle-cylinder-connected independent exhaust pipes are located between the active-cylinder-connected independent exhaust pipes and the direct catalyst 40. As a result, the idle-cylinder-connected independent exhaust pipes which are deactivated and tend to be cooled while the engine 1 is performing the cylinder-cutoff operation, may have their temperature maintained by the heat dissipated from the active-cylinder-connected independent exhaust pipes and the heat of reaction of the catalyst 42 in the direct catalyst 40. This checks the decrease in the temperature of the overall exhaust manifold even more effectively. In addition, even right after the mode of operation has been switched from the cylinder-cutoff operation to the all-cylinder operation, the heat of the exhaust gas released from the idle cylinders may also be conducted efficiently to the direct catalyst 40.

The present disclosure is in no way limited to the exemplary embodiments described above, but may be modified, varied, or replaced without departing from the spirit of the present disclosure as defined by the appended claims.

For example, in the exemplary embodiments described above, the first and fourth cylinders 2a and 2d serve as the idle cylinders and the second and third cylinders 2b and 2c serve as the active cylinders. In an alternative embodiment, however, the first and fourth cylinders 2a and 2d may serve as the active cylinders and the second and third cylinders 2b and 2c may serve as the idle cylinders. In that case, the slits 28 may be cut through the upper cover 27a to face either the first and fourth independent exhaust pipes 32a and 32d or a portion thereof where the first and fourth independent exhaust pipes 32a and 32d are combined together.

In the exemplary embodiment described above, the slits 28 are cut through a portion of the upper cover 27a which faces the second and third independent exhaust pipes 32b and 32c and a combining portion where the second and third independent exhaust pipes 32b and 32c are combined together. However, slits may also be cut through another portion of the upper cover 27a which faces the second intermediate collecting pipe 33b. In that case, however, the region with the slits 28 should not be expanded excessively to prevent too much air blowing against the vehicle from entering the heat insulator 27.

Note that the foregoing description of exemplary embodiments is intended to give only an example of the present disclosure and not to limit the scope of the present disclosure in any way. That is to say, various modifications or variations may be made to those described embodiments without departing from the spirit and scope of the present disclosure that are delineated only by the appended claims.

What is claimed is:

1. An exhaust insulator structure for a multi-cylinder engine of a vehicle, the structure comprising:
   an exhaust manifold configured to collect together multiple flows of an exhaust gas released from a plurality of columnar cylinders of the multi-cylinder engine;
   an exhaust gas purifier connected to an exhaust gas downstream end of the exhaust manifold and configured to purify the exhaust gas; and
   a heat insulator configured to cover the exhaust manifold and the exhaust gas purifier with some gap left with respect to the exhaust manifold and the exhaust gas purifier, wherein
   the engine is able to switch its mode of operation from an all-cylinder operation in which all of the plurality of cylinders are activated to a cylinder-cutoff operation in which some of the plurality of cylinders are deactivated to serve as idle cylinders and the other cylinders are activated to serve as active cylinders, or vice versa, and
   the exhaust manifold includes: idle-cylinder-connected branched exhaust piping communicating with the idle cylinders; and active-cylinder-connected branched exhaust piping communicating with the active cylinders, and a portion of the heat insulator facing the active-cylinder-connected branched exhaust piping has an opening that lets air blowing against the vehicle travel into the heat insulator.

2. The exhaust insulator structure of claim 1, wherein
the multi-cylinder engine is mounted transversely in an engine compartment at a front end of the vehicle such that a direction in which the columnar cylinders are arranged in line is parallel to a vehicle width direction, a side surface of the engine facing a rear end of the vehicle being coupled to the exhaust manifold,
an exhaust gas upstream end of each of the idle-cylinder-connected branched exhaust piping and the active-cylinder-connected branched exhaust piping is arranged to extend from the side surface of the engine facing the rear end of the vehicle toward the rear end of the vehicle,
the heat insulator includes: an upper cover configured to cover, and arranged over, the exhaust manifold and the exhaust gas purifier; and a lower cover configured to cover, and arranged under, the exhaust manifold and the exhaust gas purifier, and
the opening is cut through a portion of an upper surface of the upper cover facing the active-cylinder-connected branched exhaust piping.

3. The exhaust insulator structure of claim 2, wherein
the engine is an in-line four-cylinder engine,
the direction in which the four cylinders of the engine are arranged in line is parallel to the engine,
if the four cylinders are sequentially called first, second, third, and fourth cylinders, respectively, from one of the four cylinders located at one end of the engine toward another one of the four cylinders located at the other end of the engine, then the first and fourth cylinders serve as the idle cylinders and the second and third cylinders serve as the active cylinders,
the idle-cylinder-connected branched exhaust piping is comprised of: two idle-cylinder-connected independent exhaust pipes respectively communicating with the two idle cylinders; and an idle-cylinder-connected intermediate collecting pipe formed by combining together the two idle-cylinder-connected independent exhaust pipes,
the active-cylinder-connected branched exhaust piping is comprised of: two active-cylinder-connected independent exhaust pipes respectively communicating with the two active cylinders; and an active-cylinder-connected intermediate collecting pipe formed by combining together the two active-cylinder-connected independent exhaust pipes,
the exhaust manifold further includes a last collecting pipe formed by combining together those idle-cylinder-connected and active-cylinder-connected intermediate collecting pipes,
the exhaust gas purifier is connected to an exhaust gas downstream end of the last collecting pipe, and
the active-cylinder-connected independent exhaust pipes are arranged to pass through a space over the idle-cylinder-connected independent exhaust pipes.

4. The exhaust insulator structure of claim 3, wherein
the active-cylinder-connected intermediate collecting pipe is arranged to pass through a space over the idle-cylinder-connected intermediate collecting pipe, and
the opening is located to face the two active-cylinder-connected independent exhaust pipes and a portion where the two active-cylinder-connected independent exhaust pipes are combined together when the heat insulator covers the exhaust manifold and the exhaust gas purifier.

5. The exhaust insulator structure of claim 3, wherein
the upper cover and the lower cover are arranged such that when the heat insulator covers the exhaust manifold and the exhaust gas purifier, a lower end of the upper cover is located outside of an upper end of the lower cover and that a gap is left between the lower end of the upper cover and the upper end of the lower cover.

6. The exhaust insulator structure of claim 3, wherein
a downstream exhaust pipe allowing the exhaust gas purified by the exhaust gas purifier to pass therethrough is connected to an exhaust gas downstream end of the exhaust gas purifier,
the heat insulator covers the exhaust manifold and the exhaust gas purifier as well as a region surrounding a portion where the downstream exhaust pipe is connected to the exhaust gas purifier, and
a portion of the heat insulator located closer to the rear end of the vehicle than the idle-cylinder-connected branched exhaust piping has a tunnel portion allowing a portion of the downstream exhaust pipe, located closer to a downstream end of the exhaust gas than the portion connected to the exhaust gas purifier, to reach outside of the heat insulator.

7. The exhaust insulator structure of claim 6, wherein
the tunnel portion is cut through the lower cover.

8. The exhaust insulator structure of claim 3, wherein
the active-cylinder-connected independent exhaust pipes are shorter in length than the idle-cylinder-connected independent exhaust pipes.

9. The exhaust insulator structure of claim 3, wherein
the exhaust gas purifier is located under the idle-cylinder-connected independent exhaust pipes.

* * * * *